J. Humphrey,
Making Clothes Pins.
Nº 16,923.    Patented Mar. 31, 1857.
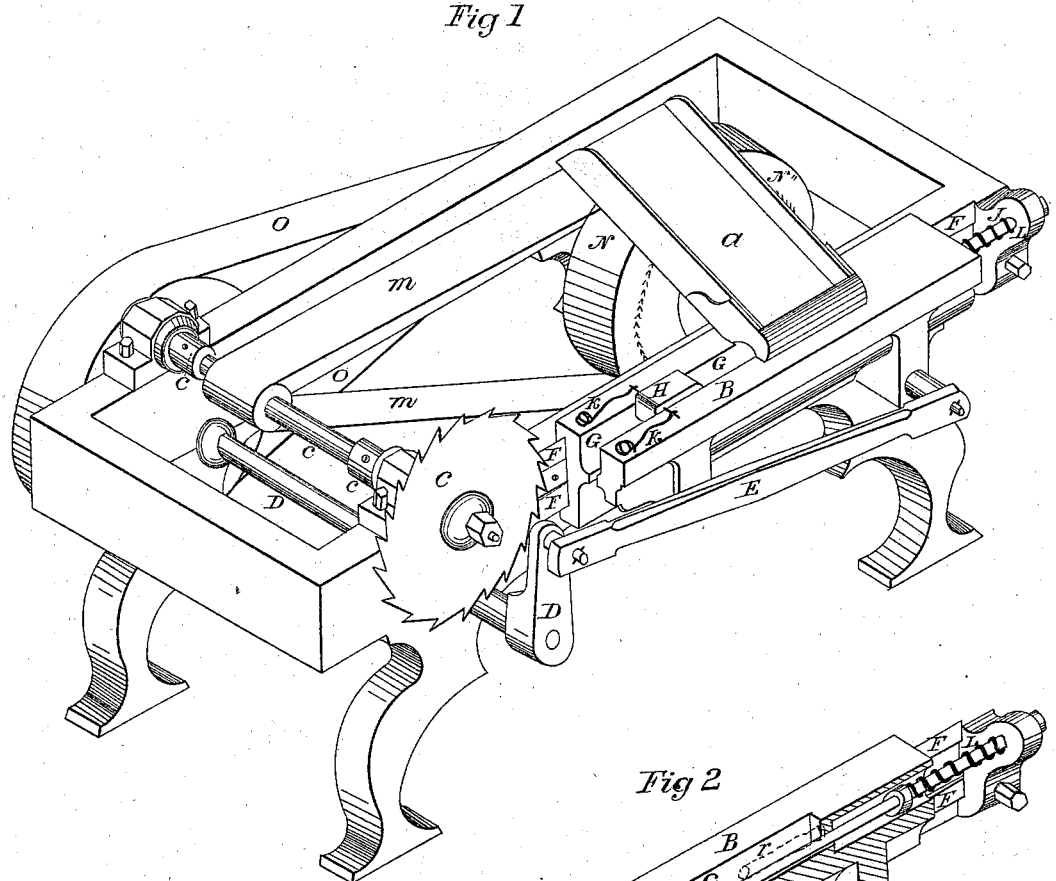
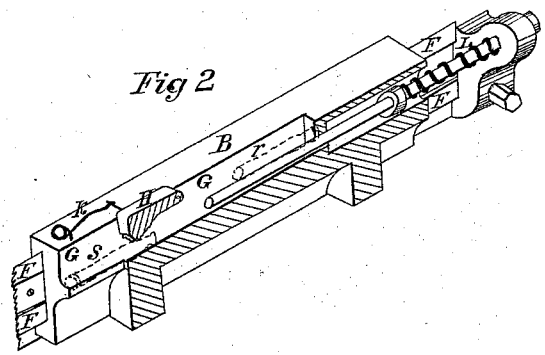
 
Witnesses:    Inventor:
F. F. Lane
James W. Russell Jr    John Humphrey

UNITED STATES PATENT OFFICE.

JOHN HUMPHREY, OF KEENE, NEW HAMPSHIRE.

MACHINE FOR CUTTING SLOTS IN CLOTHES-PINS.

Specification of Letters Patent No. 16,923, dated March 31, 1857.

*To all whom it may concern:*

Be it known that I, JOHN HUMPHREY, of Keene, in the county of Cheshire and State of New Hampshire, have invented a new and useful Machine for Cutting the Slots in Clothes-Pins; and I do hereby declare that the following is a full and exact description of the same, reference being made to the annexed drawings.

Figure 1 is a perspective view of the machine. Fig. 2 shows the holder cut through the center of the groove lengthwise, also the driving rod, &c.

This machine is arranged to cut the slot in the pin after it is turned.

The pins are placed in the inclined spout A, which conducts them to the groove in the holder.

B is the holder. It has a sliding or reciprocating motion to and from the saw C, which it receives from the crank D, to which it is connected by the pitman E. It slides upon the ways F, F. It is constructed with a groove or channel G, in which the pin is secured (by means of the dog H) while the saw is cutting the slot. The groove also extends backward from the dog so as to receive the pins from spout A, and will admit one pin each time the holder is moved back from the saw, (bringing the groove to a position directly underneath the spout).

I is a rod (which is stationary) for driving the pins forward from the end of the groove which receives them to the position for the cutting of the slot.

The pin as it is received from spout A lies on the driving-rod (as seen at *r*, Fig. 2). It is carried forward by the moving of the holder and drops off the end of the rod to the bottom of the groove. Then as the holder recedes from the saw it is pressed forward by the driving rod to the position (seen at *s*, Fig. 2) for the action of the saw. The next advance of the holder carries it on to the saw and it cuts the slot, and when the holder recedes it is discharged out the end of the groove by another pin being driven into the same place, and so on, slotting one pin at each revolution of the crank.

The dog H which holds the pins is pressed down by the springs *k k*. The driving-rod I is kept in place by a spring L, which will allow it to slide back in case the groove G becomes obstructed, thereby preventing accident to the machine.

The saw C is the same as commonly used for slotting clothes-pins. It has an arbor C' and may be adjusted to cut in the center of the pin by the collars *c c*. It is driven by band *m* from pulley N.

N is a shaft (not seen in the drawings) which has a pulley for the band which drives the machine and also for driving the crank shaft D.

O is a band for the crank shaft.

The principle of my invention consists in having the part for holding the pins (which I term the holder) constructed in such a manner that the pins may be received into a groove or channel behind the part in which they are secured for the action of the saw, and then driven forward by a driving-rod or its equivalent to the position in which they are secured for the action of the saw, and using in combination with the same the saw, the dog, the inclined spout, or their equivalents and suitable mechanism for operating the same, making thereby a self-operating machine possessing the advantages of an easy and expeditious method of feeding the pins into the holder without making use of any irregular or intermittent motions, thereby simplifying the mechanism and making it less expensive, less liable to get out of order, and capable of running at greater speed, and performing more work in a given time with less labor and expense than by methods heretofore employed for the same purpose.

I do not wish to confine myself to the use of the particular mode which I have described, as different modes may involve the same principle. It is not necessary that the holder should have a reciprocating motion, but it may be stationary and the saw and driver have a reciprocating motion. Either mode would accomplish the same object with the same principle in the construction of the holder.

Other equivalent means may be employed instead of those which I have described for feeding and securing the pins in the holder, as they are well known and have been used for this and similar purposes. Sliding holders have also been used heretofore, but not constructed on the principle which I have described as my invention.

I do not claim the saw, the inclined spout, or the means of securing the pins for the action of the saw separate from the holder. Neither do I claim a sliding holder irrespective of its construction; but

I claim—

1. A holder so constructed that the pins may be received into a groove or channel behind the part in which they are secured for the action of the saw, and then driven forward by a driving-rod or its equivalent to the proper position for the cutting of the slots, the same being stationary or having a reciprocating motion as described.

2. I claim in combination with the holder, the saw, the inclined spout, and the dog H, or their equivalents for the purposes set forth.

JOHN HUMPHREY. [L. S.]

Witnesses:
F. F. LANE,
JAMES W. RUSSELL, Jr.